Figure 1:
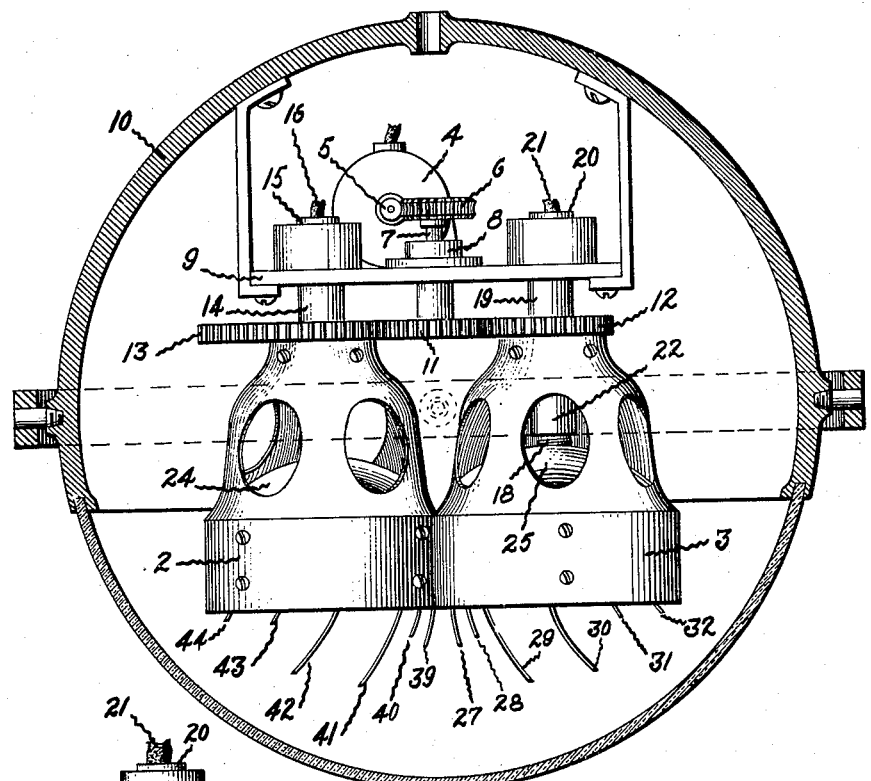

May 22, 1928.　　　　　　　　　　　　　　1,670,682
C. A. B. HALVORSON, JR., ET AL
SIGNALING DEVICE
Filed March 14, 1923

Inventors:
Cromwell A. B. Halvorson Jr.,
Richard B. Hussey,
by
Their Attorney.

Patented May 22, 1928.

1,670,682

UNITED STATES PATENT OFFICE.

CROMWELL A. B. HALVORSEN, JR., OF LYNN, AND RICHARD B. HUSSEY, OF SWAMPSCOTT, MASSACHUSETTS, ASSIGNORS TO GENERAL ELECTRIC COMPANY, A CORPORATION OF NEW YORK.

SIGNALING DEVICE.

Application filed March 14, 1923. Serial No. 625,096.

Our invention relates to signaling devices which are especially adapted for signaling to or from aeroplanes. It is often the case that an aeroplane wishes to flash light-signals to a particular station by the use of a directed bundle of rays, but does not know the exact direction of the station, and vice versa a station often wishes to signal a particular aeroplane but does not know the location of the aeroplane. It is one of the objects of our invention to provide a signaling device which will enable a signaling station, whether in an aeroplane or on land to signal a receiving station with a directed bundle of rays regardless of whether the sending station knows the exact position of the receiving station or not.

It is one of the objects of our invention to provide means by which all the rays of light from a suitable source, such as a high powered incandescent lamp, are taken and directed so that they are all thrown out into a fan shaped beam, for example, between two parallel vertical planes. It is also an object to provide means whereby the beam may be rotated about a vertical axis. With such a device an aeroplane may from above direct such a beam down and cover a quadrant space from the nadir to the horizontal. Furthermore by rotating the beam about a vertical axis along the vertical side of the quadrant a signal can be flashed to any station within the sweep of the fan which, of course, will cover a very large circle with the foot of the vertical axis as its center. It will be obvious that the receiving station will receive one flash for each revolution of the beam and that if the rotation is rapid the flashes will occur at a rapid rate. On the other hand, if the rotation of the beam is slow, the flashes will occur at a slow rate. If flashes at a rapid rate are considered to represent dots, and if flashes at a slow rate are considered to represent dashes, it is obvious that signaling can be carried on between the aeroplane and a receiving station on the ground by using the dot and dash code.

We contemplate also providing means for producing flashes at a rapid rate, and means for producing flashes at a slower rate. This may be done by providing two separate sources of light, each in connection with a circuit-closing switch. By closing one switch, one light is brought into use for producing the rapid flashes; by closing the other switch the other light is brought into use for producing the less rapid flashes.

Another object of our invention is to provide other details of improvement for increasing the efficiency and serviceability of a signaling device of the above character. To accomplish the foregoing and other useful ends, we provide such means as are hereinafter more fully set forth and claimed, reference being had to the accompanying drawing.

Figure 2:
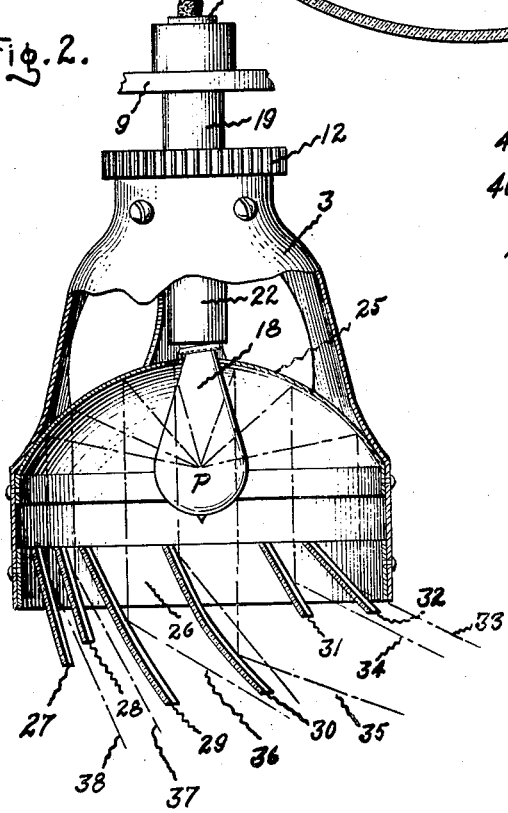
Figure 3:
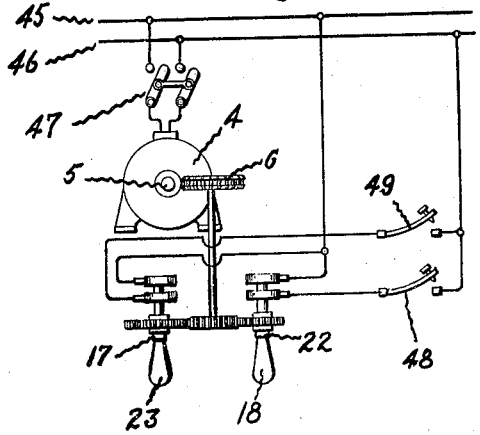

Referring more in detail to the drawing, Fig. 1 is a view in elevation and partially in section of the signaling device; Fig. 2 is enlarged view partially in section of the apparatus Fig. 1; Fig. 3 is a diagrammatic illustration of apparatus and circuits by means of which the signaling is done.

Referring more in detail to the drawing, if the device in Fig. 1 is considered as hung from the lower part of an aeroplane, it will be more easily understood. The device has a pair of rotating hoods 2 and 3, Fig. 1. These hoods are rotated by means of a motor 4 with which the hoods are suitably geared. The gearing arrangement comprises a worm on the shaft 5 of the motor, a worm gear 6 on the shaft 7 which meshes with said worm. The shaft 7 is suitably journaled in a bearing 8 which is mounted on a crosspiece 9 which is part of the framework and which is secured to the shell 10 of the device. On the lower end of the shaft 7 there is provided a gear 11 which meshes on one side with the gear 12 of the hood 3, and on the other side with the gear 13 of the hood 2. In the particular arrangement shown in the drawing the gearing is such that the hood 2 rotates twice as fast as the hood 3. The hood 2 is mounted on a sleeve 14 which rotates on the shaft 15, which shaft is permanently secured to the frame 9. This shaft is hollow, in order that a cable 16 containing circuit wires may pass through to the lower end of the shaft at which lower end a suitable lamp socket 17 is secured for holding an incandescent lamp 23 or other suitable source of light. The hood 3 is similarly mounted on a sleeve 19 which rotates about the shaft 20 just as the sleeve 14 rotates about the shaft 15. As indicated, a cable 21 also passes through the shaft 19 and extends down through to the socket 22 for holding an electric light bulb 18. Within each one of the rotating elements there is provided a parabolic reflector; the element 2 is provided with a parabolic reflector 24, and the element 3 is provided with a parabolic reflector 25. As indicated in the drawing, the lamps 18 and 23 project through the reflectors 25 and 24, the filaments of which are located at or about the focal point P of the reflector as indicated in Fig. 2.

Near the mouth of the hood 3 there is mounted a ring 26, with a series of reflecting plates 27, 28, 29, 30, 31 and 32. These reflectors are in the path of the parallel rays that are reflected from the parabolic reflector 25. The rays of light from the lamp 18 strike the reflector 25 and are reflected as a bundle of parallel rays in a direction parallel with the longitudinal axis of the reflector 25, which, of course, passes through the focal point P. Each of these reflecting plates intercepts some of the parallel rays from the reflector 25, sending the reflected rays as a bundle parallel to a line sloping with respect to the major axis of the reflector 25, which line may be considered in the plane of the drawing. In other words, the reflector 32 intercepts a number of rays and deflects them in a bundle parallel to the line 33. Similarly, the reflecting plate 31 reflects a portion of the rays in a bundle parallel to the line 34. Likewise, the plate 30 reflects a portion of the rays parallel to the line 35. Similarly, the plates 29, 28 and 27 reflect intercepted rays parallel to the lines 36, 37 and 38. It will be seen, therefore, that the plates 27 through 32 produce a fan-like beam confined to a space between two planes parallel to the lines 33, 34, 35, 36, 37 and 38 and spaced apart a distance not greater than the diameter of the ring 26. It is obvious that by rotating the hood 3, the fan-like beam will be rotated about a vertical axis passing through the shaft 20 of the reflector. The parabolic reflector 24 is supplied with a similar set of reflecting plates 39, 40, 41, 42, 43 and 44 for the same purpose. Two fan-like beams may thus be produced, each of which may be rotated; one about the axis of the shaft 20 and the other about the axis of the shaft 15. If the lamp 18 is lighted while the hood 3 is rotating, and assuming that the rate of rotation of this reflector is ten times a second, the beam of light will sweep the horizon and can be observed by any station within its sweep flashing at the rate of ten times a second. On the other hand, if the lamp in the reflector 2 is lighted, and assuming that the rate of its rotation is five times a second, any station within the sweep of the beam will observe flashes from this reflector at the rate of five a second. Assuming now that the display of the beam which is rotated at the rate of ten a second signifies a dot in the Morse telegraph code, and assuming that the display of the beam which flashes at the rate of five a second represents a dash in the same code, it is obvious that any station within the sweep of the beams may be signalled with the dot and dash code. For example, if it is desired to send the following code, viz: dot-dash-dot-dash, the hood 3 will be operated for a short interval of time during which time it may rotate five times, for example. This will indicate a dot. Now if the hood 2 is lighted during an interval of time corresponding to five rotations, this will indicate a dash. If this operation is now repeated once more, it is obvious that the receiving station will on the whole receive the signal dot-dash-dot-dash. During the signaling process, the motor 4 is continually running and the hoods 2 and 3 are continually rotating. The signaling operation is controlled by throwing the lamps within the reflectors 24 and 25 on and off. This can be done through the medium of suitable keys, such as keys 48 and 49 indicated in Fig. 3. In the upper part of the drawing the conductors 45 and 46 represent the power mains, which may be connected to any suitable source of current. By throwing the switch 47, the motor 4 is started and, therefore, the hoods 2 and 3 of the signaling device are started up. By pressing the key 48 a circuit is closed through the lamp 18 across the power mains 45 and 46. The key 48 may be held depressed one second, thereby permitting the hood 3 to rotate a number of times, thus transmitting a dot signal by its rate of rotation. Thereafter the key 49 may be pressed for ½ a second to light the lamp 23 and causing the hood 2 to rotate its beam a number of times and by its rate of flashing transmit a dash signal. By thus manipulating the keys 48 and 49, any desired signal may be flashed by the dot-and-dash system. It will be understood that the signaling can be carried on by depressing the keys 48 and 49 the same length of time for each signal, inasmuch as the number of flashes is not essential, but only the rate of flashing. The only essential is that the hoods 2 and 3 must be each maintained lighted a sufficient length to enable the receiving station to determine by the rate of flashing whether a dot or dash is intended.

It will be understood that the reflecting surfaces 27 et seq all lie at right angles to a common plane, as for example, a plane parallel to or through the major axis of the reflector, and such for example as the plane of the drawing, the shield 10 may be secured to any suitable part of the aeroplane, on the lower side of the shield there is mounted a transparent cover 50. When the device is to be used for signaling from the ground to an aeroplane, its position is, of course, reversed. In that case each beam is spread from zenith to the horizontal, the rotation, of course, takes place again about a vertical axis.

Although we have shown only one embodiment of our invention, we do not wish to be restricted to this particular embodiment shown, as various modifications for accomplishing the same results will readily occur to those versed in the art without departing from the spirit of the claims.

What we claim as new and desire to secure by Letters Patent of the United States, is:

1. In a signaling mechanism, a device comprising a source of light, a reflector for producing a beam of light, a surface for intercepting said beam to change the direction thereof, means for moving the surface to cause the new beam to travel periodically over a given path, and a second similar device, the rate of travel of the two devices being different whereby they may be used in combination for signaling in accordance with a code, said mechanism comprising also means for selectively cutting off the beams from said devices, said devices being so located that the beams may sweep over the same region.

2. In a signaling mechanism, a device comprising a source of light, a reflector for producing a beam of light, a plurality of surfaces, each for intercepting a section of the beam to change the direction thereof, said surfaces so disposed with respect to each other that the intercepted rays are directed to form a new beam and means for moving said surfaces so as to cause the new beam to travel periodically over a given path about an axis parallel to the axis of the reflector, and a second similar device, the rate of travel of the two devices being different whereby they may be used in combination for signaling in accordance with a code, said mechanism comprising also means for selectively cutting off the beams from said devices, said devices being so located that the beams may sweep over the same region.

3. In a signaling mechanism, a source of light, a reflector for producing a beam of light, a plurality of surfaces, each disposed to intercept a section of the beam to change the direction thereof, said surfaces disposed also with respect to each other so that the intercepted rays are directed to form a new beam, and means for moving said surfaces so as to cause the new beam to travel periodically over a given path, and a second similar device, the rate of travel of the two devices being different whereby they may be used for signaling in accordance with a code, said surfaces all sloping toward a plane to one side of the reflector and parallel with the axis of the reflector, said mechanism comprising also means for selectively cutting off the beams from said devices, said devices being so located that the beams may sweep over the same region.

4. In a signaling device an electric lamp serving as a source of light, a circuit over which the lamp is supplied with electric current, a reflector for producing a beam of light, a reflecting surface for intercepting said beam to change the direction thereof, means for rotating the surface to cause the reflected beam to travel periodically over a given path, a second similar rotating device and a common driving mechanism for maintaining the rate of rotation of the two devices different, said mechanism comprising also means for selectively cutting off the beams from said devices.

5. In a signaling device an electric lamp serving as a source of light, a circuit over which the lamp is supplied with electric current, a reflector for producing a beam of light, a reflecting surface for intercepting said beam to change the direction thereof, means for rotating the surface to cause the reflected beam to travel periodically over a given path about an axis parallel to the axis of the reflector, a second similar device and a common driving mechanism for maintaining the rate of rotation of the two devices different, whereby they may be used in combination for signaling in accordance with a code, said mechanism comprising also means for selectively cutting off the beams from said devices.

In witness whereof, we have hereunto set our hands this tenth day of March, 1923.

CROMWELL A. B. HALVORSON, Jr.
RICHARD B. HUSSEY.